United States Patent
Eriksson et al.

(10) Patent No.: US 12,503,118 B2
(45) Date of Patent: Dec. 23, 2025

(54) METHOD FOR CONTROLLING A DRIVELINE OF A VEHICLE

(71) Applicant: VOLVO TRUCK CORPORATION, Gothenburg (SE)

(72) Inventors: Anders Eriksson, Torslanda (SE); Lars Johansson, Sätila (SE)

(73) Assignee: VOLVO TRUCK CORPORATION, Gothenburg (SE)

(*) Notice: Subject to any disclaimer, the term of this patent is extended or adjusted under 35 U.S.C. 154(b) by 298 days.

(21) Appl. No.: 18/253,515

(22) PCT Filed: Nov. 20, 2020

(86) PCT No.: PCT/EP2020/082925
§ 371 (c)(1),
(2) Date: May 18, 2023

(87) PCT Pub. No.: WO2022/106030
PCT Pub. Date: May 27, 2022

(65) Prior Publication Data
US 2023/0406317 A1 Dec. 21, 2023

(51) Int. Cl.
| | |
|---|---|
| *B60W 30/182* | (2020.01) |
| *B60W 10/06* | (2006.01) |
| *B60W 10/11* | (2012.01) |
| *B60W 30/188* | (2012.01) |
| *B60W 50/08* | (2020.01) |
| *B60W 50/14* | (2020.01) |
| *B60W 60/00* | (2020.01) |

(52) U.S. Cl.
CPC .......... *B60W 30/188* (2013.01); *B60W 10/06* (2013.01); *B60W 10/11* (2013.01);
(Continued)

(58) Field of Classification Search
CPC .... B60W 10/06; B60W 10/11; B60W 30/188; B60W 30/182; B60W 60/0023;
(Continued)

(56) References Cited

U.S. PATENT DOCUMENTS

| | | |
|---|---|---|
| 2006/0074540 A1 | 4/2006 | Braunberger et al. |
| 2011/0166731 A1 | 7/2011 | Kristinsson et al. |

(Continued)

FOREIGN PATENT DOCUMENTS

| | | |
|---|---|---|
| CN | 102713363 A | 10/2012 |
| EP | 3287335 A1 | 2/2018 |

(Continued)

OTHER PUBLICATIONS

International Search Report and Written Opinion of the International Searching Authority in corresponding International application No. PCT/EP2020/082925 mailed Aug. 3, 2021 (13 pages).

(Continued)

*Primary Examiner* — Edwin A Young
(74) *Attorney, Agent, or Firm* — Jeffri A. Kaminski; Venable LLP (57) ABSTRACT

The present disclosure relates to a method for controlling a driveline of a vehicle, the driveline being operable in a plurality of driveline operating modes, wherein the driveline is configured to assume a current driveline operating mode basing its operation on topology data from a positioning system, each driveline operating mode being associated with a predefined driveline operating condition, wherein the method comprises obtaining a signal indicative of a loss of topology data; and controlling the driveline to change from the current driveline operating mode to an updated driveline operating mode providing an increased operational capacity of the driveline compared to the current driveline operating mode.

17 Claims, 4 Drawing Sheets

(52) U.S. Cl.
CPC ........ *B60W 30/182* (2013.01); *B60W 50/085* (2013.01); *B60W 50/14* (2013.01); *B60W 60/0023* (2020.02); *B60W 2520/00* (2013.01); *B60W 2552/15* (2020.02); *B60W 2710/0644* (2013.01); *B60W 2710/1005* (2013.01)

(58) Field of Classification Search
CPC ............... B60W 50/085; B60W 50/14; B60W 2552/15; B60W 2520/00; B60W 2710/0644; B60W 2710/1005
See application file for complete search history.

(56) References Cited

U.S. PATENT DOCUMENTS

| | | | | |
|---|---|---|---|---|
| 2012/0150384 | A1* | 6/2012 | Jung | B60W 50/14 |
| | | | | 701/31.1 |
| 2013/0289808 | A1* | 10/2013 | Ross | B60W 10/08 |
| | | | | 903/930 |
| 2017/0106869 | A1* | 4/2017 | Lavoie | B60T 7/20 |
| 2018/0023692 | A1 | 1/2018 | Gauthier | |
| 2019/0318553 | A1* | 10/2019 | Pati | G01C 21/3469 |

FOREIGN PATENT DOCUMENTS

| | | |
|---|---|---|
| WO | 2011075065 A1 | 6/2011 |
| WO | 2011126430 A1 | 10/2011 |
| WO | 2014003655 A1 | 1/2014 |
| WO | 2018203790 A1 | 11/2018 |

OTHER PUBLICATIONS

International Preliminary Report on Patentability in corresponding International application No. PCT/EP2020/082925 mailed Oct. 31, 2022 (6 pages).

Chinese Office Action dated Jan. 6, 2025 in corresponding Chinese Patent Application No. 202080107184.5, 18, pages.

* cited by examiner

METHOD FOR CONTROLLING A DRIVELINE OF A VEHICLE

CROSS-REFERENCE TO RELATED APPLICATIONS

This application is a U.S. National Stage application of PCT/EP2020/082925, Nov. 20, 2020 and published on May 27, 2022 as WO 2022/106030, all of which is hereby incorporated by reference in its entirety.

TECHNICAL FIELD

The present disclosure relates to a method for controlling a driveline of a vehicle. The present disclosure also relates to a control system connectable to the driveline for controlling operation thereof, as well as to a vehicle comprising such a control system. Although the method and control system will mainly be described in relation to a heavy-duty vehicle, i.e. a truck, they may also be applicable for other types of vehicles using map data for assisting or controlling vehicle operation.

BACKGROUND

The propulsion systems of vehicles are continuously developed to meet the demands from the market. A particular aspect relates to fuel saving, resulting in a reduction of environmentally harmful exhaust gas. There is also a continuous development of improving the overall drivability of the vehicles.

In order to reduce the fuel consumption, predictive cruise control of vehicles has been implemented, where the vehicle is controlled based on preview information of the upcoming road topology. The preview information can be received from e.g. a satellite transmitting topology signals to e.g. a GPS of the vehicle. Hereby, when the vehicle is approaching an upward directing slope, a navigation system of the vehicle can prepare and control the vehicle driveline to manage the upward directing slope in the best possible manner. For example, the navigation system, or other similar system can hereby transmit a control signal to a driveline control system to execute a gear shift and control the rotational speed (rpm) of the engine in a proper manner.

However, when controlling the vehicle using such preview information of the road topology, a problem arises as how to control the vehicle driveline in situations where preview information is unavailable.

According to state of the art, WO 2011/075065 describes in its abstract a method for driving a vehicle which has a gearbox connected to a combustion engine and the gearbox is capable of being set to a number of different transmission ratios in order to deliver motive force to a driveshaft for propulsion of the vehicle.

SUMMARY

It is an object of the present disclosure to describe a method which at least partially overcomes the above described deficiencies.

According to a first aspect, there is provided a method for controlling a driveline of a vehicle, the driveline being operable in a plurality of driveline operating modes, wherein the driveline is configured to assume a current driveline operating mode basing its operation on topology data from a positioning system, each driveline operating mode being associated with a predefined driveline operating condition, wherein the method comprises obtaining a signal indicative of a loss of topology data; and controlling the driveline to change from the current driveline operating mode to an updated driveline operating mode providing an increased operational capacity of the driveline compared to the current driveline operating mode.

The wording "driveline operating mode" should be construed as an operating condition for the driveline, where the driveline is restricted to operate within a predetermined operating range. According to various non-limiting examples, the operating range may, for example, relate to a specific gear, or specific gears which a transmission of the driveline is allowed to assume, an rpm range at which an engine of the driveline is controlled, an rpm limit, or torque limit of the engine at which the transmission performs a change of gear, etc. Example embodiments of the driveline operating mode, and in particular the updated driveline operating mode are given below.

Further, the increased operational capacity should be construed such that the driveline is able to handle e.g. a steeper uphill slope compared to a lower operational capacity.

Moreover, the loss of topology data should be construed such that, e.g. a control system of the vehicle, fails to receive preview information of the road topology of the upcoming road, or of the road it is presently operating. The loss of topology data may, for example, be determined by means of suddenly not receiving any map data, or by the vehicle is operated at an area where map data is unavailable.

The present disclosure is based on the insight that by increasing the operational capacity of the driveline when determining a loss of location, the vehicle will be substantially fully operational, whereby the risk of an involuntary stop is reduced. An advantage is thus that the risk of a sudden engine stop is reduced. This is particularly advantageous when driving at an upward slope, where the present disclosure thus prevents the driveline to perform an upshift, as this might be unbeneficial due to the uncertainty of the grade of the slope. Another operational scenario could be when the vehicle is driving through a tunnel and loses topology data. The risk of an involuntary stop in the tunnel is thus reduced.

A further advantage is that the vehicle operator does not need to intervene to control the driveline. Hence, the operator does not need to, for example, manually perform a down shifting of the transmission or increase the rpm of the engine. Accordingly, the operator of the vehicle does not need to manually change the drive mode of the vehicle. Any such manual drive mode button in the vehicle can hereby be removed, thereby reducing the cost for such previously performed implementation. The present disclosure is therefore particularly suitable for an autonomously controlled vehicle.

According to an example embodiment, the updated driveline operating mode may comprise a transmission gear state with increased transmission gear ratio compared to the transmission gear ratio of the current driveline operating mode, in order to provide the increased operational capacity.

Accordingly, and as indicated above, the transmission can hereby be controlled to shift from a higher gear to a lower gear, e.g. from the fourth gear to the third gear. This will reduce the risk of an involuntary stop. The transmission gear ratio thus presents a ratio of the difference in rotational velocity of a transmission output shaft compared to the rotational velocity of the transmission input shaft connected to the engine. For lower gears, the transmission gear ratio is higher compared to higher gears. Accordingly, the third gear of the transmission has an increased gear ratio compared to the fourth gear. The gear of the transmission should here not be mixed up with the individual gear wheels present in a transmission, but is rather a gear stage of the transmission.

According to an example embodiment, for a prime mover of the driveline, a rotational speed for changing to a higher level transmission gear state of a transmission of the driveline may be higher when assuming the updated driveline operating mode compared to when assuming the current driveline operating mode, in order to provide increased operational capacity.

Hereby, any potential upshifting procedure of the transmission is executed at higher rpm of the engine, which reduces the risk that an upshift will be performed that might result in a too low rpm for the new, higher gear stage. For example, if the upshift form the third gear to the fourth gear is conventionally performed at 1800 rpm of the engine, the updated driveline operating mode may set a higher limit at e.g. 2100 rpm.

According to an example embodiment, a torque level for changing to a higher level transmission gear state of a transmission of the driveline may be higher when assuming the updated driveline operating mode compared to when assuming the current driveline operating mode.

In a similar vein as described above in relation to the higher rpm, changing to a higher gear level at a higher torque level thus increases the torque margins and reduces the risk of having too low torque at the higher transmission gear state.

According to an example embodiment, the method may further comprise obtaining, prior to the loss of topology data, a signal indicative of an upcoming road path for the vehicle, the upcoming road path comprising an upward slope portion; and controlling the driveline to change to the updated driveline operating mode based on an inclination of the upward slope portion.

Hereby, the control system may prepare the driveline in advance as it receives details of the upcoming topology. The driveline can thereby be controlled to assume a preferred updated driveline operating mode, which can be selected from a plurality of driveline operating modes.

According to an example embodiment, the driveline may be controlled to assume the updated driveline operating mode when a vehicle speed is below a predetermined threshold speed. An advantage is that the control of the driveline does not intervene when driving at high vehicle speeds, which could generate an unpleasant feeling for an operator. Thus, according to this example embodiment, the driveline is controlled to change from the current driveline operating mode to the updated driveline operating mode only when losing topology data in combination with a lower vehicle speed. According to an example embodiment, the threshold speed may be in a range between 20-45 kmph.

According to an example embodiment, the positioning system may be at least one of a GPS, a GNSS or a LIDAR system.

According to an example embodiment, the signal indicative of loss of topology data may be a signal indicative of loss of topology data for an upcoming road path for the vehicle. Hereby, the control system will be prepared that map data will not be available when arriving at the upcoming road path, and suitable preparations can be made.

According to an example embodiment, the method may further comprise obtaining a signal indicative of re-established topology data; and controlling the driveline to change from the updated driveline operating mode to the driveline operating mode assumed prior to the loss of topology data.

According to an example embodiment, the method may further comprise obtaining a signal indicative of re-established topology data; and controlling the driveline to change from the updated driveline operating mode to a driveline operating mode based on the re-established topology data.

Accordingly, the driveline can be controlled to either assume the previous driveline operating mode, or assume a new, updated driveline operating mode.

According to an example embodiment, the method may further comprise, upon obtaining the signal indicative of loss of location, transmitting a control signal to an operator of the vehicle, the control signal comprising an operator request demand to approve the change from the current driveline operating mode to the updated driveline operating mode; and controlling the driveline to assume the updated driveline operating mode when the operator request demand has been approved by the operator. The operator may hereby determine if the driveline should be arranged to assume the updated driveline operating mode or not. Thus, the operator may determine that it is more appropriate to manually intervene and control the driveline due to the circumstances of the driving situation, or may accept that the driveline assumes the updated driveline operating mode.

According to a second aspect, there is provided a control system connectable to a driveline of a vehicle, the control system comprising a positioning system and driveline mode selection module, wherein the driveline mode selection module is configured to select between a plurality of driveline operating modes based on topology data received from the positioning system, the control system comprising control circuitry configured to receive a signal from the positioning system, the signal being indicative of a loss of topology data; and control the driveline mode selection module to change from a current driveline operating mode to an updated driveline operating mode providing an increased operational capacity of the driveline compared to the current driveline operating mode.

The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

According to an example embodiment, the driveline may comprise a prime mover and a transmission for gear selection.

Effects and features of the second aspect are largely analogous to those described above in relation to the first aspect.

According to a third aspect, there is provided a vehicle comprising a driveline controlled by a control system according to any one of the embodiments described above in relation to the second aspect.

According to an example embodiment, the vehicle may be an autonomously controlled vehicle.

According to a fourth aspect, there is provided a computer program comprising program code means for performing the steps of any one of the embodiments described above in relation to the first aspect when the program is run on a computer.

According to fifth aspect, there is provided a computer readable medium carrying a computer program comprising program means for performing the steps of any one of the embodiments described above in relation to the first aspect when the program means is run on a computer.

Effects and features of the third, fourth and fifth aspects are largely analogous to those described above in relation to the first aspect.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

The above, as well as additional objects, features and advantages, will be better understood through the following illustrative and non-limiting detailed description of exemplary embodiments, wherein.

DETAILED DESCRIPTION

The present disclosure will now be described more fully hereinafter with reference to the accompanying drawings, in which exemplary embodiments are shown. The disclosure may, however, be embodied in many different forms and should not be construed as limited to the embodiments set forth herein; rather, these embodiments are provided for thoroughness and completeness. Like reference character refer to like elements throughout the description.

Figure 1:
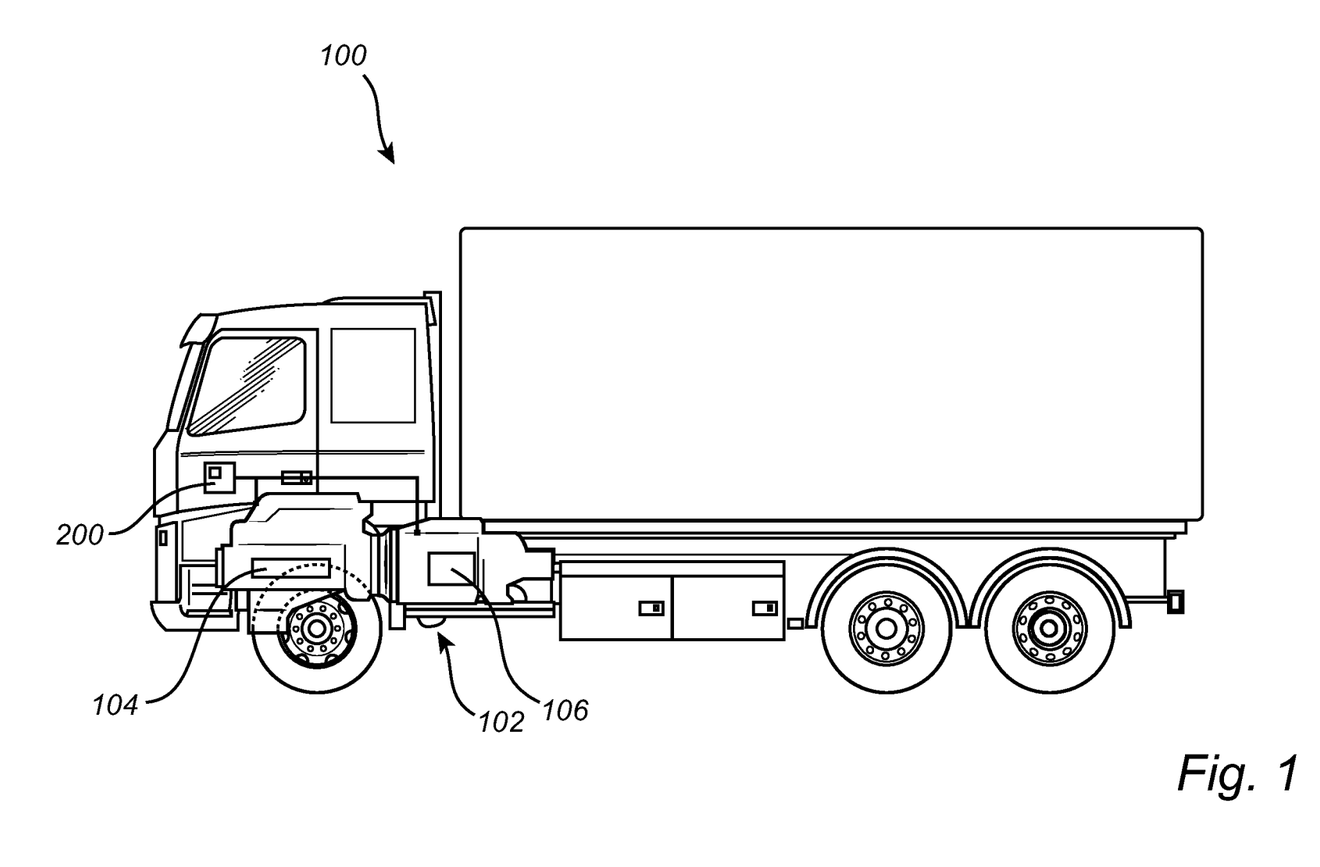
FIG. 1 is a perspective view illustrating a vehicle, here in the form of a truck, according to an example embodiment.

With particular reference to FIG. 1a, there is provided a vehicle 100 in the form of a truck. The vehicle 100 comprises a driveline 102 configured to be controlled by means of the control system and method described below. The driveline 102 comprising an engine 104 and a transmission 106 forming part of a gearbox. The engine 104 may be an internal combustion engine or an engine in the form of an electric machine. The vehicle 100 further comprises a control system 200 which is described in further detail below with reference to FIG. 3.

Figure 2:
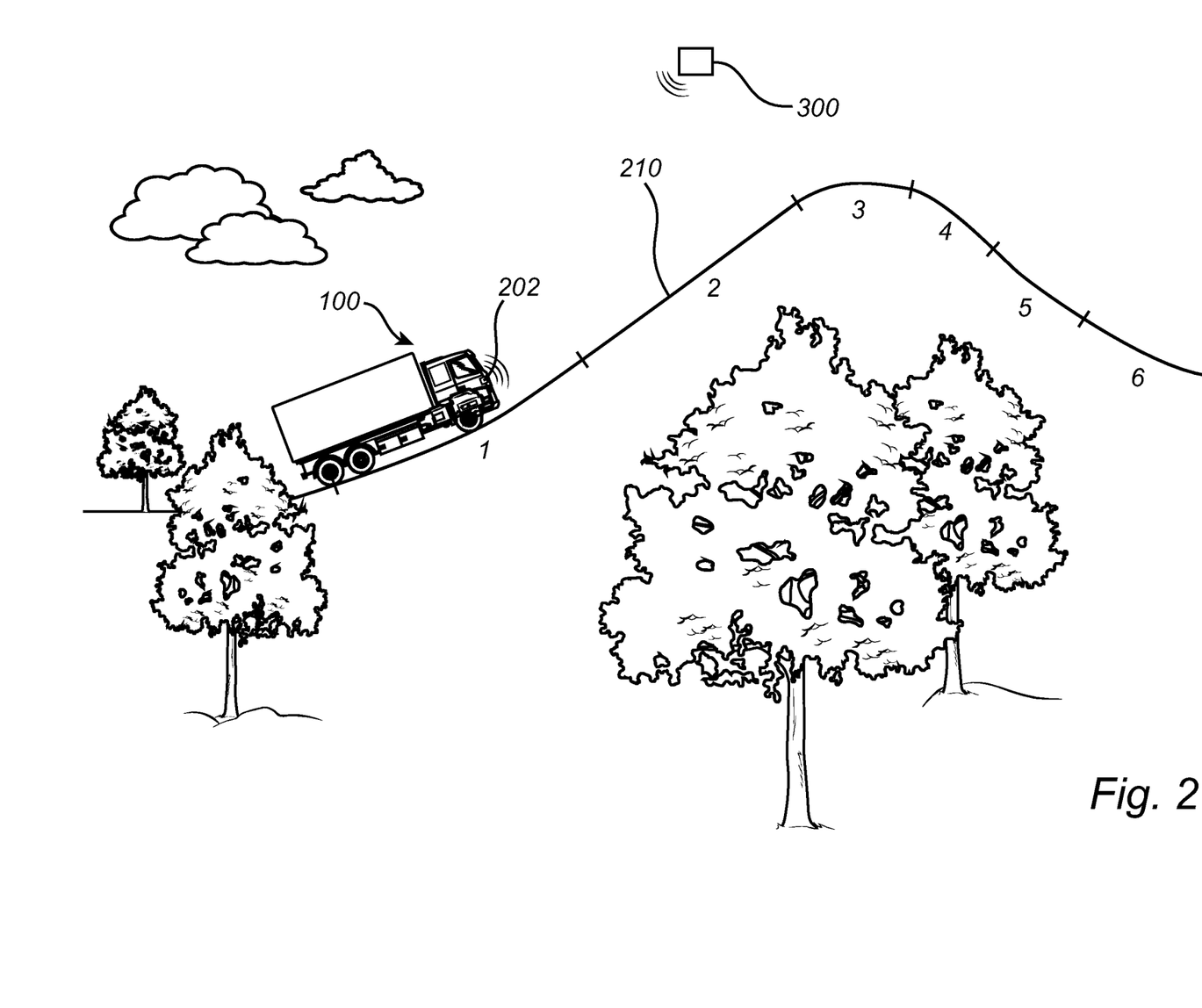
FIG. 2 illustrates the vehicle in FIG. 1 during operation at an uphill slope according to an example embodiment.

In order to describe the operational functionality of the vehicle according to an example embodiment of the present disclosure, reference is made to FIG. 2. FIG. 2 illustrates the vehicle in FIG. 1 during operation at a road path comprising an uphill slope 210 according to an example embodiment. The vehicle 100 is configured to assume a current driveline operating mode basing its operation on topology data from a positioning system 202 (illustrated in further detail in FIG. 3). The topology data is in the embodiment of FIG. 2 received from a shared data storage 300 in the form of a satellite which is in wireless communication with the positioning system 202.

The road path in FIG. 2 is exemplified as divided into six different road segments 1-6. The following will now describe example embodiments of different operating modes assumed by the driveline when operated at the road path 210 and receives map data from the shared data storage 300.

During operation at the first segment 1, the driveline assumes a driveline operating mode in which the vehicle accelerates to improve the initial hill climbing capacity. Thus, the vehicle driveline operating mode comprises increased acceleration, whereby the rpm of the engine is allowed to be relatively high before an upshift procedure is executed.

At the second segment 2, the driveline operating mode is set to avoid downshifting. Hereby, the fuel consumption is improved compared to operation at a lower gear stage. At the third segment 3, the vehicle 100 has reached the top of the hill, whereby the driveline assumes a driveline operating mode in which the vehicle speed is initially increasing before arriving at the downhill slope of the fourth segment 4. At the fourth segment 4, the driveline assumes a driveline operating mode in which the transmission is set in neutral position and the vehicle rolls freely towards the fifth segment 5.

At the fifth segment 5, the driveline assumes a driveline operating mode in which the engine 104 is controlled to perform engine braking. Hereby, over-speeding is avoided, and regenerative braking can be executed to, for example, charge a vehicle battery. At the final sixth segment 6, the driveline assumes a driveline operating mode in which the vehicle builds up speed in neutral gear of the transmission, thus preparing for further operation once leaving the sixth segment 6.

By means of the operation through these six segments 1-6 when map data is available, the utilization of the vehicle's kinetic energy is substantially optimized.

However, if the topology data is determined to be lost during operation, in particular during operation at the first 1 and/or second 2 segments, the driveline is controlled in a different manner compared to the above description, in order to avoid that the vehicle will involuntarily stop at the first or second segments. Reference is made to FIG. 2, in combination with FIG. 3 for describing in further details an example embodiment of controlling the driveline when the topology data is lost.

Figure 3:
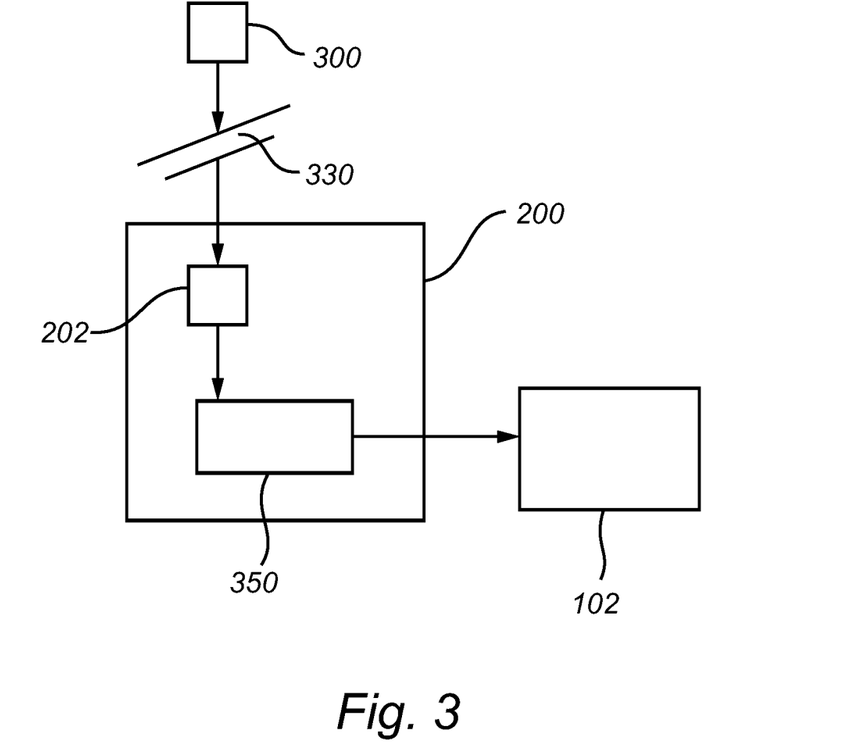
FIG. 3 is a schematic illustration of a control system according to an example embodiment.

FIG. 3 is a schematic illustration of a control system 200 according to an example embodiment. The control system 200 comprises control circuitry that may include a microprocessor, microcontroller, programmable digital signal processor or another programmable device. The processing circuitry may also, or instead, each include an application specific integrated circuit, a programmable gate array or programmable array logic, a programmable logic device, or a digital signal processor. Where the control circuitry includes a programmable device such as the microprocessor, microcontroller or programmable digital signal processor mentioned above, the processor may further include computer executable code that controls operation of the programmable device. It should be understood that all or some parts of the functionality provided by means of the control circuitry (or generally discussed as "processing circuitry") may be at least partly integrated with the control unit 200.

Furthermore, the control unit 200 comprises a positioning system 202, which is preferably a GNSS, such as a GPS. The positioning system 202 can also be a LIDAR system, or similar. The control unit 200 further comprises a driveline mode selection module 350. The positioning system 202 is configured to receive topology data from the shared data storage 300. The topology data is transmitted to the driveline mode selection module 350 which determines, based on the topology data, a driveline operating mode for optimally controlling the driveline. The driveline mode selection module 350 is connected to the driveline 102 and configured to control the operation of the driveline 102.

When the vehicle 100 is operated, as exemplified in FIG. 2, and the signal between the shared data storage 300 and the positioning system 202 is lost, as indicated by reference numeral 330, a signal indicative of loss of topology data is received by the driveline mode selection module 350. In order to maintain well-functioning drivability, the driveline mode selection module 350 changes from a current driveline operating mode to an updated driveline operating mode. The change to the updated driveline operating mode is executed for providing an increased operational capacity of the driveline 102 compared to the current driveline operating mode. An operator of the vehicle may, according to a non-limiting example, be required to provide an operator request demand to the driveline mode selection module 350 for approving the change from the current driveline operating mode to the updated driveline operating mode.

According to an example embodiment, the updated driveline operating mode may comprise a change of transmission gear state of the transmission 106, where the transmission is changed to a lower gear state. The updated driveline operating mode may also, as an option or in addition to the gear change, comprise a higher rotational speed and/or higher engine torque for upshifting to a higher gear state compared to the current driveline operating mode assumed when receiving the topology data. In this case, the change from a current gear state to a higher gear state is executed at higher rotational speed/engine torque compared to a "normal" operating condition.

When determining a specific updated driveline operating mode, the driveline mode selection module 350 may have received data beforehand of e.g. an inclination of the road path ahead, and can thus decide a suitable updated driveline operating mode for being able to sufficiently operate the vehicle at the slope in case of a loss of topology data. In detail, the driveline mode selection module 350 can receive topology data from the positioning system 202 indicative of the inclination of the first 1 and/or second 2 road segment depicted in FIG. 2.

Furthermore, in order to prevent e.g. downshifting of the transmission at higher vehicle speeds, which could result in an uncomfortable driving experience, the driveline mode selection module 350 may be configured to only control the driveline in the updated driveline operating mode when the vehicle speed is below a predetermined threshold speed, such as in the range between 20-45 kmph.

When the positioning system 202 re-establish topology data from the shared data storage 300, the driveline mode selection module 350 may change back to the driveline operating mode assumed prior to the loss of topology data, or change to a new driveline operating mode based on the current topology of the road path.

Figure 4:
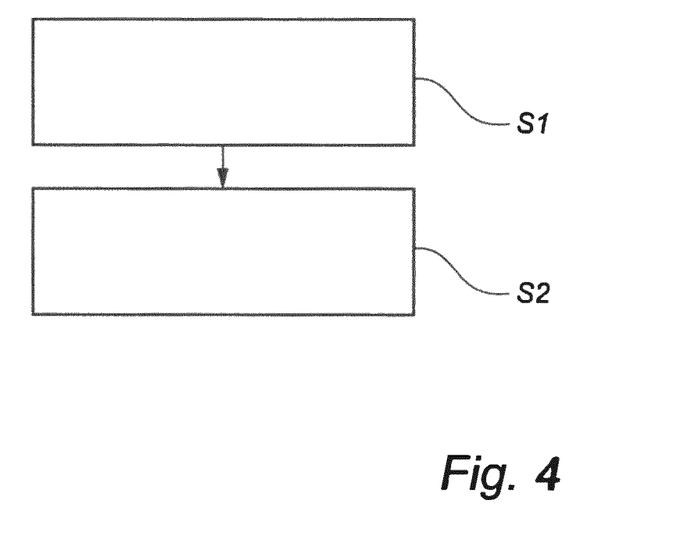
FIG. 4 is a flow chart of a method for controlling a driveline of the vehicle in FIG. 1 according to an example embodiment.

In order to sum up, reference is made to FIG. 4 which is a flow chart of the method of controlling the driveline 102 of the vehicle. As described above, a signal is obtained S1 by the positioning system 202, which signal is indicative of loss of topology data 330. Thus, the positioning system 202 fails to receive topology data from the shared data storage 300. When the loss of topology data is determined, the driveline mode selection module 350 controls the driveline 102 to change from the current driveline operating mode to the updated driveline operating mode providing an increased operational capacity of the driveline compared to the current driveline operating mode.

It is to be understood that the present disclosure is not limited to the embodiments described above and illustrated in the drawings; rather, the skilled person will recognize that many changes and modifications may be made within the scope of the appended claims.

The invention claimed is:

1. A method for controlling a driveline of a vehicle, the driveline being operable in a plurality of driveline operating modes, wherein the driveline is configured to assume a current driveline operating mode basing its operation on topology data from a positioning system, each driveline operating mode being associated with a predefined driveline operating condition, the method being characterized by:
obtaining a signal indicative of a loss of topology data; and
controlling the driveline to change from the current driveline operating mode to an updated driveline operating mode providing an increased operational capacity of the driveline compared to the current driveline operating mode when losing topology data.

2. The method according to claim 1, wherein the updated driveline operating mode comprises a transmission gear state with increased transmission gear ratio compared to a transmission gear ratio of the current driveline operating mode, in order to provide the increased operational capacity.

3. The method according to claim 1, wherein, for a prime mover of the driveline, a rotational speed for changing to a higher level transmission gear state of a transmission of the driveline is higher when assuming the updated driveline operating mode compared to when assuming the current driveline operating mode, in order to provide the increased operational capacity.

4. The method according to claim 1, wherein a torque level for changing to a higher level transmission gear state of a transmission of the driveline is higher when assuming the updated driveline operating mode compared to when assuming the current driveline operating mode.

5. The method according to claim 1, wherein the method further comprises:
obtaining, prior to the loss of topology data, a signal indicative of an upcoming road path for the vehicle, the upcoming road path comprising an upward slope portion; and
controlling the driveline to change to the updated driveline operating mode based on an inclination of the upward slope portion.

6. The method according to claim 1, wherein the driveline is controlled to assume the updated driveline operating mode when a vehicle speed is below a predetermined threshold speed.

7. The method according to claim 6, wherein the threshold speed is in a range between 20-45 kmph.

8. The method according to claim 1, wherein the positioning system is at least one of a GPS, a GNSS or a LIDAR system.

9. The method according to claim 1, wherein the signal indicative of loss of topology data is a signal indicative of loss of topology data for an upcoming road path for the vehicle.

10. The method according to claim 1, further comprising:
obtaining a signal indicative of re-established topology data; and
controlling the driveline to change from the updated driveline operating mode to a driveline operating mode assumed prior to the loss of topology data.

11. The method according to claim 1, further comprising:
obtaining a signal indicative of re-established topology data; and controlling the driveline to change from the updated driveline operating mode to a driveline operating mode based on the re-established topology data.

12. The method according to claim 1, further comprising:
upon obtaining the signal indicative of loss of topology data, transmitting a control signal to an operator of the vehicle, the control signal comprising an operator request demand to approve the change from the current driveline operating mode to the updated driveline operating mode; and
controlling the driveline to assume the updated driveline operating mode when the operator request demand has been approved by the operator.

13. A non-transitory computer readable medium carrying a computer program comprising program code operative to receive data from the positioning system to perform the steps of claim 1 when the program code is run on a computer.

14. A control system connectable to a driveline of a vehicle, the control system comprising a positioning system and driveline mode selection module, wherein the driveline mode selection module is configured to select between a plurality of driveline operating modes based on topology data received from the positioning system, characterized in that the control system comprises control circuitry configured to:
receive a signal from the positioning system, the signal being indicative of a loss of topology data; and
control the driveline mode selection module to change from a current driveline operating mode to an updated driveline operating mode providing an increased operational capacity of the driveline compared to the current driveline operating mode when losing topology data.

15. The control system according to claim 14, wherein the driveline comprises a prime mover and a transmission for gear selection.

16. The vehicle comprising the driveline controlled by the control system according to claim 13.

17. The vehicle according to claim 16, wherein the vehicle is an autonomously controlled vehicle.

\* \* \* \* \*